(No Model.)

I. COOPER & L. W. JOHNSON.
WAGON BRAKE.

No. 267,328. Patented Nov. 14, 1882.

United States Patent Office.

IRA COOPER AND LEWIS W. JOHNSON, OF THOMPSON, OHIO.

WAGON-BRAKE.

SPECIFICATION forming part of Letters Patent No. 267,328, dated November 14, 1882.

Application filed April 13, 1882. (No model.)

*To all whom it may concern:*

Be it known that we, IRA COOPER and LEWIS W. JOHNSON, of Thompson, in the county of Geauga and State of Ohio, have invented a certain new and Improved Brake for Wagons, &c.; and we do hereby declare that the following is a full, clear, and complete description thereof.

The nature of our invention relates to wagon-brakes; and it consists in arranging the brake in the form of a lever, one end of which acts upon the wheels, while to the other end is connected a rod or cord, so as to cause the brake to act upon one or both hind wheels. The rod or cord may be connected with a lever or other mechanism for working the brake, or it may be done personally by the driver.

For a more full and exact description of the invention, reference will be had to the following specification and to the annexed drawings, making a part of this specification, in which—

Figure 1:
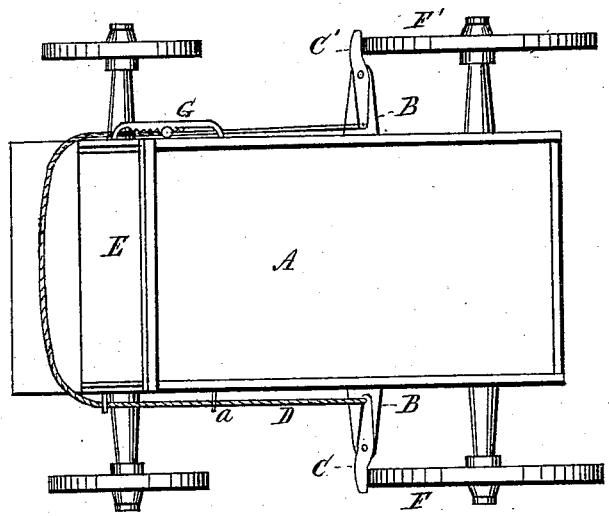
Figure 2:
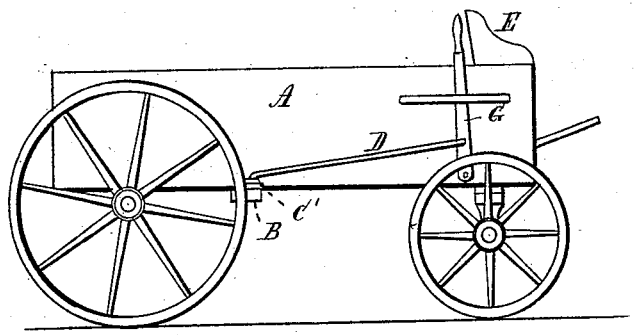

Figure 1 is a top view of a wagon with the brake attached. Fig. 2 is a side view of Fig. 1.

Like letters of reference refer to like parts in the several views.

This brake is applicable to all wagons, as usually constructed, and can be applied to other vehicles than ordinary wagons.

To the under side of the body or box A is secured a cross-bar, B, which extends from the under side of the body, as seen in Fig. 1, and to each projecting end is securely pivoted the brake-levers C C'. The outer ends of the brakes reach out over the wheels, as seen in Fig. 1, and to the other ends are attached a rod or cord, D, respectively, which may run forward to the driver's seat at E, Fig. 2, so as to be convenient for him to operate the brakes either by hand or by placing the cord under his foot. The rod or cord passes through an eyebolt, a, secured to the side of the body or box, to prevent the same from sagging or dropping down. By pressing the cord forward from the driver's seat or body A it will turn the brake-levers C C' so as to have the outer arm of the levers bear upon the tires or peripheries of the wheels F F', causing a frictional resistance upon the wheel in proportion to the force exerted upon the rope D, and upon both wheels at the same time, or upon one only, as may be required.

The brakes may be operated by a lever on one or both sides, as seen in Fig. 2. When the lever G is attached to the wagon it extends up, to be convenient for the driver or others to handle it. In Fig. 2 the brake-rod D connects the lever C' and brake-lever. By means of this connection the brake-lever may be operated by the lever G.

This construction and arrangement of the brake mechanism admits of the brake-levers being operated either separately or jointly, and with or without the lever G, as the brakes may be worked by the cord or rod, if required. This arrangement makes a durable and effective brake, and is more simple and less expensive than the brakes as usually constructed for this purpose.

What we claim as our invention, and desire to secure by Letters Patent, is—

A wagon-brake consisting of two levers pivoted to the outer ends of the cross-bar B, in combination with the lever G and cord or rod D, attached to one end of said levers and extending forward therefrom to a convenient point for the driver, whereby the hind wheels may be jointly or separately acted upon, as and for the purpose set forth.

In testimony whereof we affix our signatures in presence of two witnesses.

IRA COOPER.
LEWIS W. JOHNSON.

Witnesses:
LESTER A. WILSON,
H. B. PALMER.